United States Patent Office 3,466,568
Patented Sept. 9, 1969

3,466,568
LIQUID LASER
Adam Heller, Bayside, N.Y., assignor to General Telephone & Electronics Laboratories Incorporated, a corporation of Delaware
Filed Oct. 3, 1966, Ser. No. 583,549
Int. Cl. H01s 3/20
U.S. Cl. 331—94.5                                13 Claims

ABSTRACT OF THE DISCLOSURE

A liquid laser in which the active medium consists of a solution of a complex solute comprised of a compound of neodymium and an alpha-dihalo-carboxylic acid, and an organic solvent which forms a coordination complex with the neodymium. In a typical medium the alpha-dihalo-carboxylic acid is selected from the group consisting of perhaloacids and alpha-dihaloacids and the organic solvent is dimethylsulfoxide-$d_6$.

---

This invention relates to liquid lasers and in particular to a laser in which the active medium is a liquid capable of stimulated emission at room temperature.

The term "laser" is an acronym for "light amplification by the stimulated emission of radiation." The light which is amplified includes not only the visible portion of the frequency spectrum but also the infrared and ultraviolet bands and resides within an approximate wavelength band of from $10^2$ to $10^6$ angstroms.

The operation of the laser depends on the interaction of radiation with matter which occurs when matter (i.e., atoms or molecules) either absorbs or emits photons. Usually, atoms and molecules exist in a stable non-radiating or ground state in which energy is not emitted. This state corresponds to a fixed quantity or level of internal energy. When an atom is in the ground state and interacts with an incident photon, the atom or molecule can absorb the energy of the photon and be placed in a higher or "excited" state, provided that the energy of the photon is at least equal to the difference in energy of the ground and excited states. Similarly, when the energy level of an atom or molecule is suddenly changed from one state to a lower energy state, a photon of radiation may be produced. The energy of this photon will be equal to the difference in energy between these states.

An atom in an excited state can emit a photon spontaneously and revert to its ground state or some intermediate state. However, during the period in which the atom is still excited, it can be stimulated to emit a photon by interacting with an incident photon if the energy of this photon is equal to that of the photon which would otherwise be emitted spontaneously. As a result, the incoming photon or wave is augmented by the one given up by the excited atom. This released wave falls in phase with the wave that triggered its release. Hence, an amplifying action ensues. This phenomenon is known as stimulated emission.

Under ordinary conditions, there are more atoms in the lower energy states than in the higher energy states. In the laser, the distribution of electrons among the energy levels is changed by a process of "pumping" so that there will be more atoms in the higher than in the lower states. (The process of pumping consists of injecting some form of energy, for example electromagnetic energy, into the assemblage of atoms whereupon the atoms absorb energy and are raised into excited states.) The incident photons of the lowest energy can produce more downward than upward transitions and stimulated emission can be produced.

In the laser, a suitable active material is enclosed in a cavity resonator having at least two separated reflecting walls. A wave starting out anywhere between the walls of the chamber will grow in amplitude until the wave reaches either wall where it will be reflected back into the medium. In practice, there are losses due to imperfect reflections, absorption and scattering. However, if the amplification by stimulated emission is large enough to compensate for these losses, a wave can build up in the resonator.

A wave that starts at any position between the reflecting ends of the resonator will travel toward one end with increasing amplitude. When it reaches the end, the wave is reflected back toward the starting point which results in a further increase in amplitude. The gain in energy of the wave during the repeated passages compensates for losses at the reflecting surfaces and elsewhere and a wave will build up. Each time the wave is reflected at an end, a very small portion of the wave passes through this end, this portion constitutes the laser output wave.

The output of the laser is highly directional since the waves which are emitted must make many repeated passages without significantly deviating from a path parallel to the axis of the resonator. (If a wave is inclined at an angle with respect to this path, it will leave the resonator after few if any repeated reflections and will not have the opportunity to grow appreciably in amplitude.) The output waves are monochromatic (i.e., have essentially a single frequency) since stimulated emission takes place most strongly at frequencies in the middle of the band of frequencies emitted by spontaneous radiation. The initial stimulated emission at these frequencies will cause further emission at the same frequencies so that the output waves will contain only an extremely narrow range of frequencies or wavelengths.

Considerable interest has resulted from the initial investigations of laser phenomena and the generation of stimulated emission has been found to occur in many solids and gases. However, when laser action is based on ions embedded in a crystal lattice only single crystals or glasses free from imperfections can serve as solid laser materials. This is due to the fact that crystal imperfections cause scattering which impair and, in some cases, destroy the coherent amplification. As a result, crystal or glass media must be extremely carefully prepared.

Liquid active media eliminate the problems of single-crystal growth and shaping. The use of a liquid medium permits a reasonable concentration of active material in a given volume. Also, the working fluid may be circulated thereby providing a solution to the difficult problem of cooling the medium. Another advantage obtainable through the use of liquid media is the relative immunity from shattering or cracking under thermal or mechanical shock possessed by liquid systems.

One type of liquid laser is known to have been tested and operated. This laser employs a chelated-type of metallo-organic compound. In the chelated lasers, a central metal ion is held in a ring-shaped cyclic structure by a number of organic ligands. One such liquid laser is described in the copending application Ser. No. 473,034 filed July 19, 1965 in the names of C. Brecher, A. Lempicki and H. Samelson and assigned to the same assignee as the present application.

In the chelated liquid laser, stimulated emission is obtained by the following described mechanism. When a light of the proper wavelength is incident upon a solution of the chelated metal ion in an appropriate solvent, energy is absorbed by the chelating complex and a transition occurs, with the chelating ring rising from its ground state to a higher singlet level. The chelating complex then relaxes to an intermediate state between the ground and singlet states following which there is a transfer of energy to the chelated ion. Subsequently, there is a decay of the chelated ion to an energy level somewhat above the ground level resulting in the stimulated emission of radiation.

Although laser action takes place in this active liquid medium at room temperature, the performance of this medium has been found to be limited by the absorption of energy in the pump band of frequencies by the chelating complex. While intense absorption is characteristic of a high power output per unit volume of active material, the intense absorption of chelate species inhibits the incident radiation from penetrating beyond the surface of the active medium. As a result, the stimulated emission takes place in only a small portion of the material and the energy output of such a laser is less than that of known solids. Increasing the volume of the active medium has been found to provide little increase in the total energy output.

Accordingly, it is an object of the present invention to provide an active medium for a liquid laser in which the intense absorbance heretofore present in liquid media is substantially eliminated.

A further object is the provision of an active medium for a liquid laser in which the exciting radiation is absorbed directly by the ion providing the stimulated emission.

Another object is the provision of an active medium for a liquid laser in which radiationless relaxations of the ion providing the stimulated emission is substantially reduced.

Still another object is to provide an improved liquid laser.

In accordance with the present invention, a laser is provided in which a cavity having spaced apart reflecting surfaces is filled with a solution of a complex solute comprised of a compound of neodymium and an alpha-dihalo-carboxylic acid and an organic solvent which forms a coordination complex with the neodymium.

A coordination complex is a compound containing a central ion, in this case neodymium, that is combined by coordinate bonds with a definite number of surrounding atoms or groups and substantially retains its identity in solution. Neodymium combines with either eight or, preferably, nine surrounding groups. The solvent employed in the present medium is characterized by having in its alpha and beta positions atoms which exceed the weight of hydrogen. In a coordination complex, the alpha and beta positions refer to the immediate and immediate-but-one atoms, respectively, relative to the atom forming the coordinate bond with the neodymium.

The solute comprises a compound of neodymium and an alpha-dihalo-carboxylic acid. The acid forms a partial complex with the neodymium ion as the central ion. The neodymium ions are believed to each be bound to three or four equivalents of the acid anion. An alpha-dihalo-carboxylic acid is characterized in part by the monovalent, acidic COOH group with a second carbon atom bound to the carbon atom of the COOH group. The carbon atom is in the alpha position relative to the carboxylic (COOH) carbon atom and is bound to at least two halogen atoms. When the acid anion is bound to the neodymium, each equivalent of acid provides two oxygen atoms each of which is combined by coordinate bonds with the neodymium. Thus, the alpha and beta compositions relative to complexing atoms, i.e. the oxygen atoms, are both occupied by carbon atoms.

In solution, the neodymium can be made to form a complex with three or four of the acid anions. The remaining coordinate bonds are formed with the solvent and, if added to the solute, an organic coordinating agent. The coordinating agent may be employed to enhance the solubility of the neodymium salt added to the solvent. To do this, the complexing agent lowers the crystal energy of the salt and forms part of the coordination complex. The coordinating agent is characterized by the fact that the atoms bound to complexing atoms of the agent have a weight which exceeds that of hydrogen.

Stimulated emission of radiation is obtained by a mechanism which is believed to be as follows. When light of the appropriate wavelength is incident on the solution, energy is absorbed directly by the neodymium ions and a transition occurs from the ground state to a higher excited level. The ions then relax to a metastable state from which the stimulated emission takes place. The transitions terminate in a normally unoccupied level above the ground state as is characteristic of four-level laser action.

Since the exciting radiation is absorbed directly by the neodymium, as shown by the excitation characteristic of the present active medium which peaks at 10560 angstroms, the excessive absorbance characteristic of organic chelating agents wherein the metal ion is pumped through the chelating agent is essentially eliminated.

Trivalent neodymium, an ion heretofore used in crystal and glass active media, is generally known to undergo rapid radiationless relaxation to the ground state when in liquid solutions. This relaxation is due to high energy vibrations of bonds involving light atoms, particularly hydrogen. However, it has been found that employing an alpha-dihalo-carboxylic acid in the preparation of the neodymium-containing solute and using only organic solvents which have atoms heavier than hydrogen in the alpha and beta positions substantially eliminates radiationless relaxation in excited neodymium ions in liquid solutions.

By using "heavy" atom materials in the active medium, the active medium apparently lacks vibrations of sufficient energy to accept, even upon undergoing transitions to higher vibrational states, the energy corresponding to the energy gap between the excited and the ground state multiplets of neodymium.

Further features and advantages of the invention will become readily apparent from the following description taken in conjunction with the accompanying drawings in which.

Figure 1:
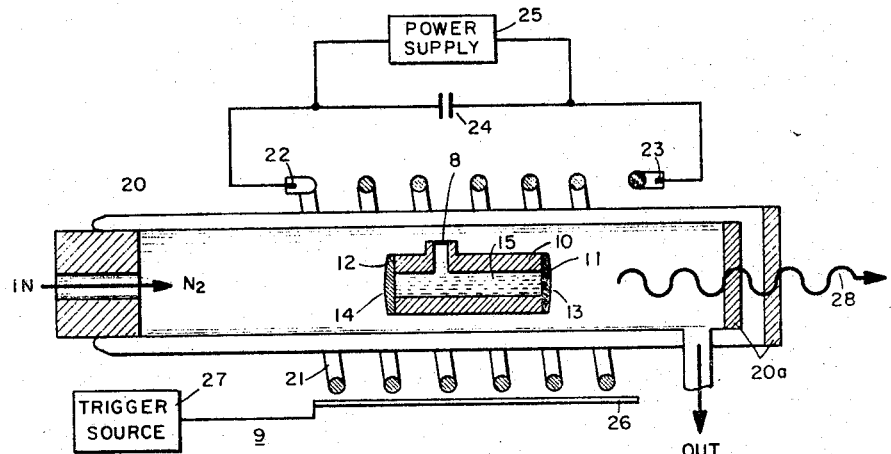
FIG. 1 is a schematic representation of a liquid laser.

Referring now to FIG. 1, there is shown schematically a laser 9 comprising a hollow transparent cylinder 10 which may be made of quartz or other optically transparent material having a low temperature coefficient of expansion. By optically transparent is meant that the walls of cylinder 10 transmit radiation with negligible attenuation at the frequency required to pump the laser. Quartz end plates 11 and 12 are sealed on each end of cylinder 10. The inner face of each end plate is flat and the outside face is optically polished to provide high quality spherical surfaces. A reflecting surface, 13 and 14, such as silver, gold or suitable multilayer dielectric coatings, are evaporated onto the outside faces. Alternatively, one reflecting surface may be replaced by a prism which provides total internal reflection.

The cavity 15 defined by the inside of cylinder 10 and end plates 11 and 12 is completely filled with the active laser medium leaving in the sealed side arms 8 sufficient space for the thermal expansion of the liquid. The medium is a liquid containing neodymium as the metal ion undergoing the population inversion between energy levels characterizing the stimulated emission of radiation.

The active medium comprises a solution of a salt of neodymium and an alpha-dihalo-carboxylic acid in an organic solvent which has in both its alpha and beta positions, relative to the atom of the solvent which complexes the neodymium ion, only atoms which are heavier than hydrogen. Typical solvents which are suitable are deuterated dimethylsulfoxide $CD_3SOCD_3$, deuterated acetonitrile $CD_3CN$, deuterated tetramethylene sulphone

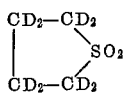

deuterated tetramethylene urea $(CD_3)_2NCON(CD_3)_2$, and deuterated dimethylformamide $DCON(CD_3)_2$.

The solute is itself a complex with the neodymium being bound to three or four molecules of the acid anion. The organic structure of the anion of an alpha-dihalo-carboxylic acid in which the halogen is chlorine is generally shown as follows

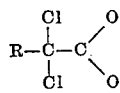

wherein R is a group such as $CF_3$, $CH_3$, or a halogen such as Cl or F. Each of the oxygen atoms forms a coordinate bond with a neodymium ion. Three or four such anions are bound to each neodymium ion depending on the preparation of the solute and whether a coordinating agent is added to the solute.

Examples of suitable alpha-dihalo-carboxylic acids for use in the preparation of the solute are the per halo acids; trifluoroacetic, trichloroacetic, chlorodifluoroacetic, pentafluoropropionic, and heptafluorobutyric acids, and the alpha-dihalo acids, such as alpha-dichloropropionic acid.

In order to increase the solubility of the neodymium salt in the organic solvent, it has been found desirable to prepare a mixed complex of an alpha-dihalo-carboxylic acid and a coordinating agent which has no hydrogen atoms in the complexing positions relative to the neodymium such as ortho-phenanthroline alpha, alpha'-dipyridyl and their derivatives. The use of a coordinating agent enhances solubility thereby permitting an increased number of neodymium ions per unit volume of active medium.

The range of concentration of the active medium is from 0.02 moles per liter to the limit of solubility of the particular solute employed. A saturated solution employed in the laser of FIG. 1 as the active medium gave no indication of self quenching.

The following solutes, which are mixed organic complexes containing ortho-phenanthroline as the coordinating agent were prepared in the same manner by dissolving one equivalent of neodymium chloride $NdCl_3$ in ethyl alcohol and adding, with stirring, an alcohol solution of three equivalents of a sodium or potassium salt of an alpha-dihalo-carboxylic acid. The sodium chloride or the potassium chloride is removed by filtration. One equivalent of ortho-phenanthroline in an alcohol solution is added to the filtered liquid. The resulting precipitate is collected and dried in vacuo at 80 to 100° C. The solutes so prepared have these general formulae:

$Nd(C_{12}H_8N_2)(CF_3COO)_3$
$Nd(C_{12}H_8N_2)(CCl_3COO)_3$
$Nd(C_{12}H_8N_2)(CClF_2COO)_3$
$Nd(C_{12}H_8N_2)(CF_3CF_2COO)_3$
$Nd(C_{12}H_8N_2)(CF_3CF_2CF_2COO)_3$

Figure 2:
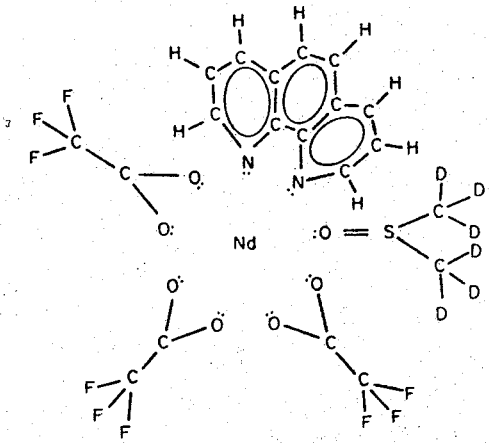
FIG. 2 shows the structural formula for one embodiment of the invention.

The structure of one of the above complexes dissolved in dimethylsulfoxide-$d_6$ is shown in the two-dimensional drawing of FIG. 2. It shall be noted that the neodymium ion is coordinately bonded to nine complexing atoms. Six atoms are oxygen atoms of the alpha-dihalo-carboxylic acid used in the preparation of the solute and two atoms are nitrogen of the coordinating agent. The solvent contributes one oxygen atom.

The use of the anion of an alpha-dihalo-carboxylic acid in combination with a solvent characterized by having atoms in its alpha and beta positions, relative to its complexing atom, that are heavier than hydrogen results in the formation of a coordination complex in which no atoms proximate to the neodymium contain vibrations of sufficient energy to accept energy of the excited state which corresponds to the emission at 10560 angstroms. As a result, radiationless relaxations of neodymium from its metastable to ground states are essentially eliminated. The use of a coordinating agent, such as ortho-phenanthroline, having only atoms heavier than hydrogen bound to its complexing atom is found to maintain this relative freedom from radiationless relaxations.

Although the neodymium ion is shown in FIG. 2 as forming coordinate bonds with nine atoms, neodymium may also form bonds with eight atoms in certain circumstances. If the coordinating agent is omitted in the preparation of the solute, it is believed that the neodymium ion bonds with two or three solvent molecules rather than one thereby resulting in a solution of reduced concentration.

In operation, the cylinder 10 is filled with the solution and placed within a helical high-intensity xenon flash lamp 21 placed around the tube. Electrodes 22 and 23 are connected to the ends of the helical flash tube 21 and a capacitor 24 coupled between the terminals. A power supply 25 maintains a constant voltage of about 10 kilovolts across capacitor 24. The cylinder 10 is normally at room temperature.

When the xenon lamp is flashed by applying a 20 to 30 kilovolt trigger pulse to wire 26 from trigger source 27, energy is absorbed directly by the neodymium ions and stimulated emission is obtained as indicated by arrow 28. The wavelength of the absorbed radiation is in the approximate range of 4500 to 9000 angstroms. Stimulated emission of radiation occured at a wavelength of approximately 10560 angstroms which corresponds to the known $4_{F3/2} \rightarrow 4_{I11/2}$ transition of neodymium.

Figure 3:
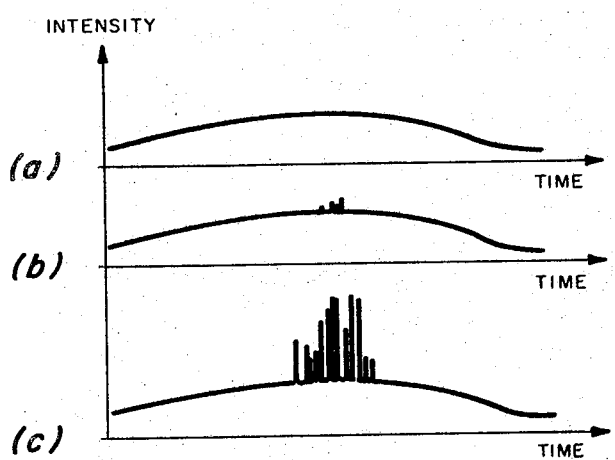
FIGS. 3a, 3b and 3c show the fluorescent intensity of several embodiments of the invention below, at and above the threshold respectively.

FIGS. 3a, 3b and 3c are oscillograms of the radiation obtained from the output of a photo-multiplier when the laser was stimulated by a flash from a xenon lamp having a duration of the order of 100 microseconds and an energy input of 313, 315 and 318 joules respectively. The results were obtained with 0.25 M solution of the afore-prepared five mixed organic complexes in dimethylsulfoxide-$d_6$.

The relaxation oscillations appearing in FIG. 3b are characteristic of laser operation and indicate the threshold for stimulated emission of radiation to be approximately 315 joules.

While the above description has referred to specific embodiments of the invention, it will be recognized that many variations and modifications may be made therein without departing from the spirit and scope of the invention.

What is claimed is:
1. An active medium for a liquid laser consisting essentially of a solution of
   (a) a complex solute which comprises a compound of neodymium and an alpha-dihalo-carboxylic acid, and
   (b) an organic solvent forming a coordination complex with the neodymium, said solvent having atoms in the alpha and beta positions relative to the atom complexing the neodymium having a weight exceeding that of hydrogen.

2. The active medium of claim 1 in which said solute further comprises an organic coordinating agent, said coordinating agent forming part of said coordination complex and being characterized by the fact that atoms bound to the complexing atoms of said agent have a weight which exceeds that of hydrogen.

3. The active medium of claim 1 in which said solution has a concentration within the range of 0.02 M to the limit of solubility of said solute.

4. The active medium of claim 1 in which said organic solvent is dimethylsulfoxide-$d_6$.

5. The active medium of claim 1 in which said alpha-dihalo-carboxylic acid is an acid selected from the group consisting of perhaloacids and alpha-dihaloacids.

6. The active medium of claim 5 in which said organic solvent is dimethylsulfoxide-$d_6$.

7. The active medium of claim 6 in which said solution has a concentration of about 0.25 M.

8. The active medium of claim 7 in which said coordinating agent is ortho-phenanthroline.

9. A laser comprising
   (a) a transparent cavity having spaced apart external reflecting surfaces at opposite ends thereof;
   (b) an active medium contained in said cavity, said medium consisting essentially of a solution of
       (1) a complex solute which comprises a compound of neodymium and an alpha-dihalo-carboxylic acid, and
       (2) an organic solvent forming a coordination complex with the neodymium, said solvent having atoms in the alpha and beta positions relative to the atom complexing the neodymium having a weight exceeding that of hydrogen; and
   (c) light emitting means surrounding said transparent cavity, said medium emitting stimulated radiation when radiated by light from said light emitting means.

10. The laser of claim 9 in which the complex solute of said active medium further comprises an organic coordinating agent, said coordinating agent forming part of said coordination complex and being characterized by the fact that atoms bound to the complexing atoms of said agent have a weight which exceeds that of hydrogen.

11. The laser of claim 9 in which said active medium is a solution having a concentration within the range of 0.02 M to the limit of solubility of said solute.

12. The laser of claim 11 in which the solvent of said active medium is dimethylsulfoxide-$d_6$.

13. The laser of claim 12 in which the solute of said active medium is a salt of neodymium and a perhaloacid.

No references cited.

RONALD L. WIBERT, Primary Examiner

CONRAD CLARK, Assistant Examiner

U.S. Cl. X.R.

252—301.2